(No Model.)

A. BITTNER.
POT HOOK OR TRAMMEL.

No. 326,835. Patented Sept. 22, 1885.

WITNESSES
F. L. Ourand
Arthur L. Morsell

INVENTOR,
Adam Bittner,
By Louis Bagger & Co.
Attorneys.

N. PETERS, Photo-Lithographer, Washington, D. C.

UNITED STATES PATENT OFFICE.

ADAM BITTNER, OF BERRY, ILLINOIS.

POT-HOOK OR TRAMMEL.

SPECIFICATION forming part of Letters Patent No. 326,835, dated September 22, 1885.

Application filed August 1, 1885. (No model.)

*To all whom it may concern:*

Be it known that I, ADAM BITTNER, a citizen of the United States, and a resident of Berry P. O., in the county of Sangamon and State of Illinois, have invented certain new and useful Improvements in Pot-Hooks or Trammels; and I do hereby declare that the following is a full, clear, and exact description thereof, which will enable others skilled in the art to which it appertains to make and use the same, reference being had to the accompanying drawings, which form a part of this specification, and in which—

Figure 1:
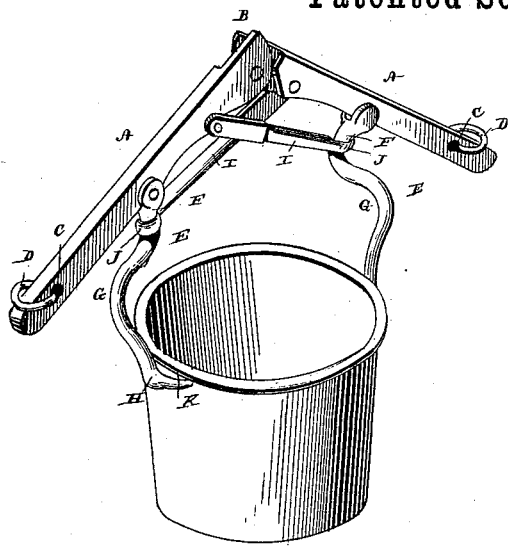
Figure 2:
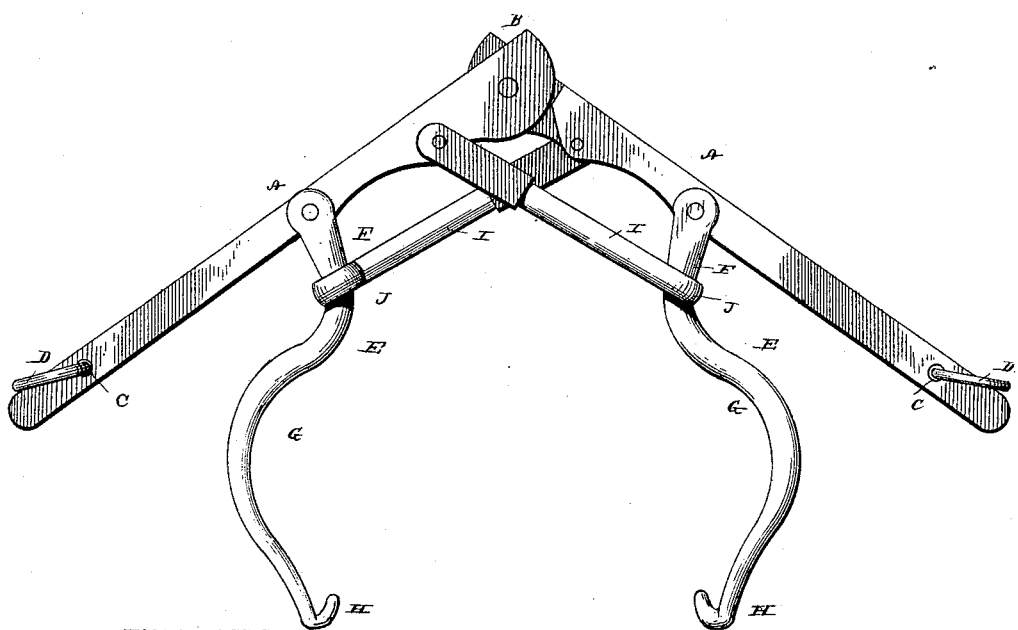

Figure 1 is a perspective view showing my improved pot-hook applied to a pot; and Fig. 2 is a side view of the same on an enlarged scale.

Similar letters of reference indicate corresponding parts in both the figures.

My invention has relation to so-called "pot-hooks," or hooks for removing pots and similar vesses from off a fire-place; and it consists in the improved construction and combination of parts of the same, as hereinafter more fully described and claimed.

In the accompanying drawings, letters A A indicate two bars united together at their ends by means of a rule-joint, B, and having transverse perforations C at their outer ends, through which perforations pass rings D, which may serve for the insertion of additional handles or for the attachment of chains. The upper ends of the curved hooks E are pivoted or hinged to the bars or handles near their inner ends, and the said hooks consist of the upper straight portions, F, curved portions G, and the hooks H, which project to both sides, being T-shaped. Two arms or bars, I I, are hinged at their inner ends to the handles near the inner ends, between the said ends and the hinges for the hooks, and the outer eyed ends J of these arms fit around and slide upon the straight portions of the hooks, the arm hinged to one handle fitting around the hook hinged to the opposite handle. It will be seen that by hooking the hooks into the ears of a pot, the legs or hooks being spread by forcing the handles together, a pot may be carried suspended from these hooks, the handles being either directly grasped by the person or persons carrying the pot or having additional handles inserted into the rings at the ends of the handles. The pot may be suspended in the fire-place from the device, chains being secured to the rings upon the handles, which chains are suitably attached to a crane or other means of attachment in the fire-place. It will also be seen that the lower ends of the legs will be forced together by the eyed arms when the handles are straightened out in carrying, so that a pot not provided with ears may be clasped between the T heads or hooks, the said T heads or hooks clamping under the rim of the pot, being bent inward so as to form shoulders K, which may fit under the rim of the pot. The legs will be forced closer together by the weight upon the hooks and their shoulders, the said weight forcing the handles to be straightened out until the rule-joint will hold the handles in a straight line, and the handles, being straightened out, will cause the eyed arms to draw the hooked legs together, causing them to clamp the pot with a firm grip. By holding the pot thus clamped there is no danger of the pot overturning, the pot being clamped rigidly by the hooked legs and the shoulders bearing against the under side of the rim.

This apparatus may be used for removing pots from open fires or from stoves or ranges. It may be used for supporting pots over a fire, when it will form a ready means for removing it from off the fire when the rings upon the handles are detached from their supports; and the device will be very useful in handling crucibles, smelting-pots, or other similar vessels; also, in handling goods of various forms and descriptions capable of being clamped and held.

Having thus described my invention, I claim and desire to secure by Letters Patent of the United States—

1. In a pot-hook, the combination of two handles united by means of a rule-joint, two legs having hooks at their lower ends and hinged upon the handles near the inner ends of the same, and two arms hinged upon the handles and having their eyed ends sliding upon the upper portions of the legs of the opposite handles, as and for the purpose shown and set forth.

2. In a pot-hook, the combination of two handles united by means of a rule-joint and having rings inserted in perforations in their outer ends, two legs having straight upper portions and curved lower portions provided at their lower ends with T-shaped hooks formed with upwardly-facing shoulders upon the inner sides, the said legs being hinged to the handles near the inner ends of the same, and two arms hinged to the handles between the joint and the hinges of the legs and having their eyed ends fitting around and sliding upon the straight portions of the legs upon the opposite handles, as and for the purpose shown and set forth.

In testimony that I claim the foregoing as my own I have hereunto affixed my signature in the presence of two witnesses.

ADAM BITTNER.

Witnesses:
A. R. STAFFORD,
JOSEPH SHARP.